(12) United States Patent
Kaita et al.

(10) Patent No.: US 11,897,566 B2
(45) Date of Patent: Feb. 13, 2024

(54) STRADDLE TYPE VEHICLE

(71) Applicant: HONDA MOTOR CO., LTD., Tokyo (JP)

(72) Inventors: Kihoko Kaita, Wako (JP); Masashi Hagimoto, Wako (JP); Yoshiyuki Kuroba, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 782 days.

(21) Appl. No.: 17/012,528

(22) Filed: Sep. 4, 2020

(65) Prior Publication Data

US 2020/0398919 A1    Dec. 24, 2020

Related U.S. Application Data

(63) Continuation of application No. PCT/JP2018/012933, filed on Mar. 28, 2018.

(51) Int. Cl.
*B62J 6/04* (2020.01)
*B62J 6/20* (2006.01)
(Continued)

(52) U.S. Cl.
CPC . *B62J 6/20* (2013.01); *B62J 6/04* (2013.01); *F01N 1/02* (2013.01); *F01N 13/10* (2013.01); *F01N 13/1811* (2013.01); *H01Q 1/3233* (2013.01); *H01Q 1/3291* (2013.01); *H01Q 15/14* (2013.01); *B62J 50/40* (2020.02)

(58) Field of Classification Search
CPC ...... B62J 50/40; B62J 6/04; B62J 6/20; F01N 1/00; F01N 1/02; F01N 13/04; F01N 13/082; F01N 13/10; F01N 13/107; F01N 13/1811; F01N 13/20; F01N 2590/04; H01Q 1/3233; H01Q 1/3291; H01Q 15/14; H01Q 15/18
See application file for complete search history.

(56) References Cited

U.S. PATENT DOCUMENTS 4,000,938 A * 1/1977 Kirk .................... B60Q 1/2688
                                                      359/522
7,490,693 B2  2/2009 Oshima et al.
(Continued)

FOREIGN PATENT DOCUMENTS

CN  105370359 A  3/2016
JP  S62085504 A  4/1987
(Continued)

OTHER PUBLICATIONS

International Search Report for PCT/JP2018/012933 dated May 29, 2018.
IPRP for PCT/JP2018/012933 dated May 22, 2020.

*Primary Examiner* — Timothy A Brainard
(74) *Attorney, Agent, or Firm* — Thomas| Horstemeyer, LLP

(57) ABSTRACT

A straddle type vehicle 1 having at least one reflecting portion 30 for reflecting a radar wave transmitted from a radar equipment. The reflecting portion 30 is provided on a cap member 40 mounted on a rear end portion 9b of an exhaust pipe 9, and the reflecting portion 30 is arranged below left and right tail lights 19 when viewed from a rear side of a vehicle body.

3 Claims, 5 Drawing Sheets

(51) Int. Cl.
  *F01N 1/02* (2006.01)
  *F01N 13/10* (2010.01)
  *F01N 13/18* (2010.01)
  *H01Q 1/32* (2006.01)
  *H01Q 15/14* (2006.01)
  *B62J 50/40* (2020.01)

(56) References Cited

U.S. PATENT DOCUMENTS

| | | |
|---|---|---|
| 2006/0076176 A1 | 4/2006 | Oshima et al. |
| 2013/0258690 A1 | 10/2013 | Oguchi |
| 2018/0364350 A1 * | 12/2018 | Lee .................. G01S 13/87 |

FOREIGN PATENT DOCUMENTS

| | | | | |
|---|---|---|---|---|
| JP | 2005225383 A | | 8/2005 | |
| JP | 2006088883 A | * | 4/2006 | |
| JP | 2006088883 A | | 4/2006 | |
| JP | 2006096132 A | | 4/2006 | |
| JP | 2013206725 A | * | 10/2013 | ........... B60Q 1/2607 |
| JP | 2013206725 A | | 10/2013 | |
| JP | 2016075570 A | * | 5/2016 | |
| JP | 2016075570 A | | 5/2016 | |
| JP | 2018045357 A | | 3/2018 | |
| WO | 2019186817 A1 | | 10/2019 | |

* cited by examiner

STRADDLE TYPE VEHICLE

CROSS-REFERENCE TO RELATED APPLICATION(S)

This application claims priority to and the benefit of PCT/JP2018/012933 filed on Mar. 28, 2018, the entire disclosure of which is incorporated herein by reference.

BACKGROUND OF THE INVENTION

Field of the Invention

The present invention relates to a rear structure of a straddle type vehicle.

Description of the Related Art

Japanese Patent Laid-Open No. 2016-075570 discloses a two-wheeled vehicle including a reflector.

In order to improve a detection accuracy of a radar equipment, it is desired to improve identifiability (ease of identification) from a farther position. In particular, since a two-wheeled vehicle has a smaller vehicle body size than a four-wheeled vehicle body size, it is difficult to identify it as a two-wheeled vehicle. In addition, as in Japanese Patent Laid-Open No. 2016-075570, in a case of merely attaching the reflector to the rear portion of the vehicle body, there is a possibility that appearance (good in appearance) and assemblability (ease of assembly) are impaired.

SUMMARY OF THE INVENTION

The present invention has been made in consideration of the aforementioned problems, and realize a straddle type vehicle capable of improving not only the identifiability as the two-wheeled vehicle but also the appearance and the assemblability.

In order to solve the aforementioned problems, according to a first aspect of the present invention, there is provided a straddle type vehicle (1) having at least one reflecting portion (30) for reflecting a radar wave transmitted from a radar equipment, wherein the reflecting portion (30) is provided on the cap member (40) mounted on a rear end portion (9b) of an exhaust pipe (9), and the reflecting portion (30) is arranged below left and right tail lights (19) when viewed from a rear side of the vehicle body.

According to a second aspect of the present invention, in the first aspect, the exhaust pipe (9) includes an exhaust manifold (9A) connected to an engine (7), and a muffler (9B) extending rearward from the exhaust manifold (9A), and the muffler (9B) is connected to the vehicle body (5) via a connecting portion (9a).

According to a third aspect of the present invention, in the second aspect, the connecting portion (9a) is arranged rearward of a central portion (LO) of the muffler (9B) in a longitudinal direction of the vehicle body.

According to a fourth aspect of the present invention, in any one of the first to third aspects, the reflecting portion (30) has a quadrangular pyramid shape in which a plurality of reflecting surfaces (31) are recessed toward a front side of the vehicle body.

According to a fifth aspect of the present invention, in any one of the first to fourth aspects, the cap member (40) is provided with a plurality of reflecting portions (30A, 30B, 30C and 30D).

According to a sixth aspect of the present invention, in the fifth aspect, the plurality of reflecting portions (30A to 30D) have different outer shapes when viewed from a reflecting direction and a rear side of the vehicle body.

According to a seventh aspect of the present invention, in anyone of the first to sixth aspects, the exhaust pipe (9) has an exhaust outlet (9d) for exhausting downward immediately before the rear portion (9b) of the exhaust pipe (9).

By virtue of the present invention, it is possible to realize a straddle type vehicle capable of improving not only the identifiability as the two-wheeled vehicle, but also the appearance and the assemblability.

More specifically, by virtue of the first aspect of the present invention, the reflection wave reflected from the reflecting portion (30) is prevented from diffusing upward, and the detection accuracy for the vehicle at a distance can be secured. Further, the radar wave is reflected on the lower side of the vehicle body with respect to the four-wheeled vehicle, such as the roof, which is a target of reflection up to the upper side of the vehicle body, thereby the identifiability between the four-wheeled vehicle and the two-wheeled vehicle is improved.

More specifically, by virtue of the second or third aspect of the present invention, it is possible to suppress a vibration of the muffler (9B) caused by the behavior of the vehicle body and the vibration of the engine, to suppress an angular change of the reflecting surface (31) of the reflecting portion (30), and to ensure a reflection accuracy.

More specifically, by virtue of the fourth aspect of the present invention, the reflection capability of the reflecting portion (30) can be improved.

More specifically, by virtue of one of the fifth to seventh aspects of the present invention, it is possible to ensure the identifiability for the vehicle in the vehicle width direction not only when traveling straight but also when turning. Further, it is possible to improve the external appearance when viewed from the rear side of the muffler, and to improve the assemblability for the rear portion of the muffler.

DESCRIPTION OF THE EMBODIMENT

Figure 1:
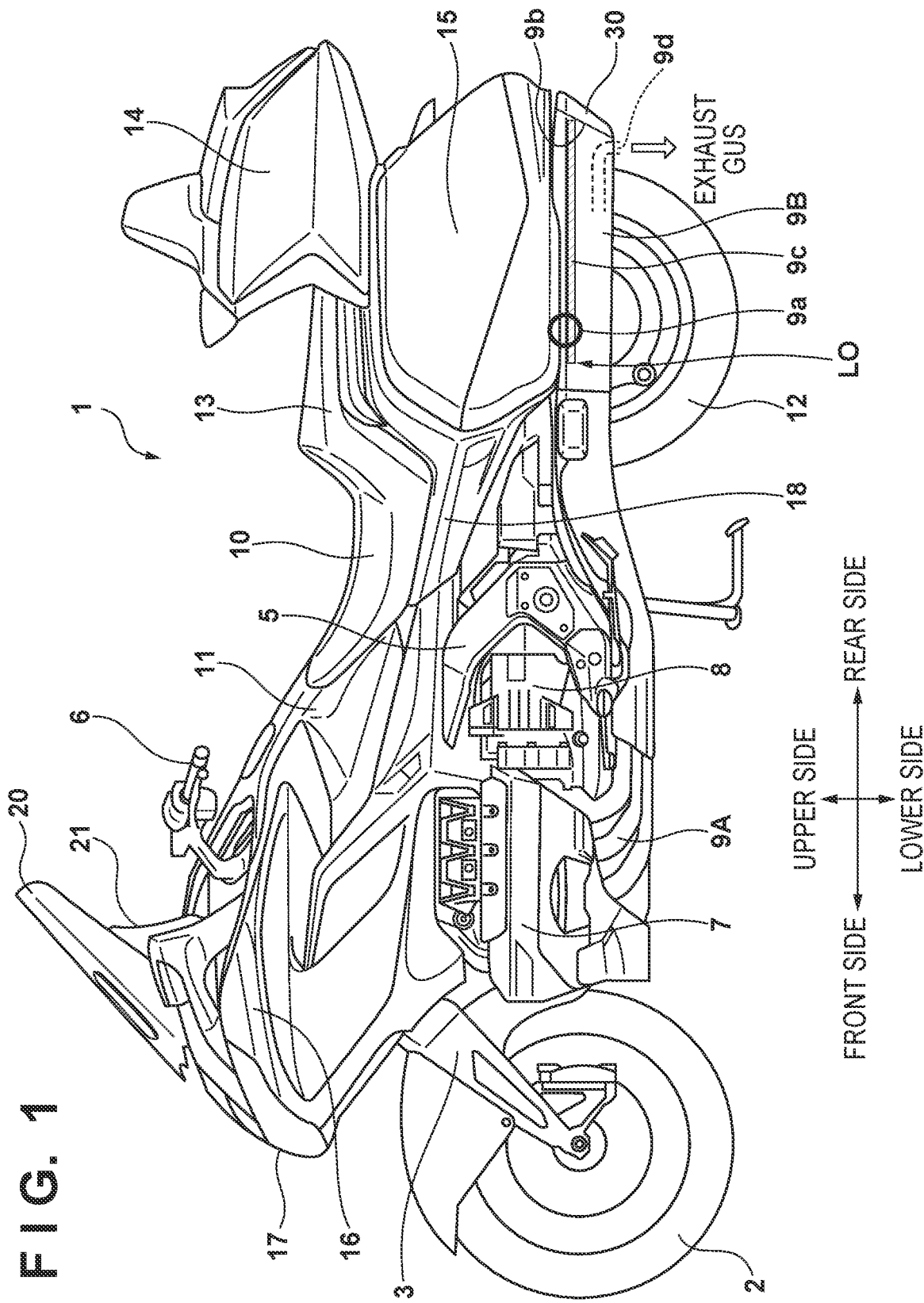
FIG. 1 is a left side view showing an external appearance of a straddle type vehicle according to a present embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Although an example in which the straddle type vehicle of the present invention is applied to a motorcycle will be described below, it is needless to say that the present invention is also applicable to other vehicles.

Figure 2:
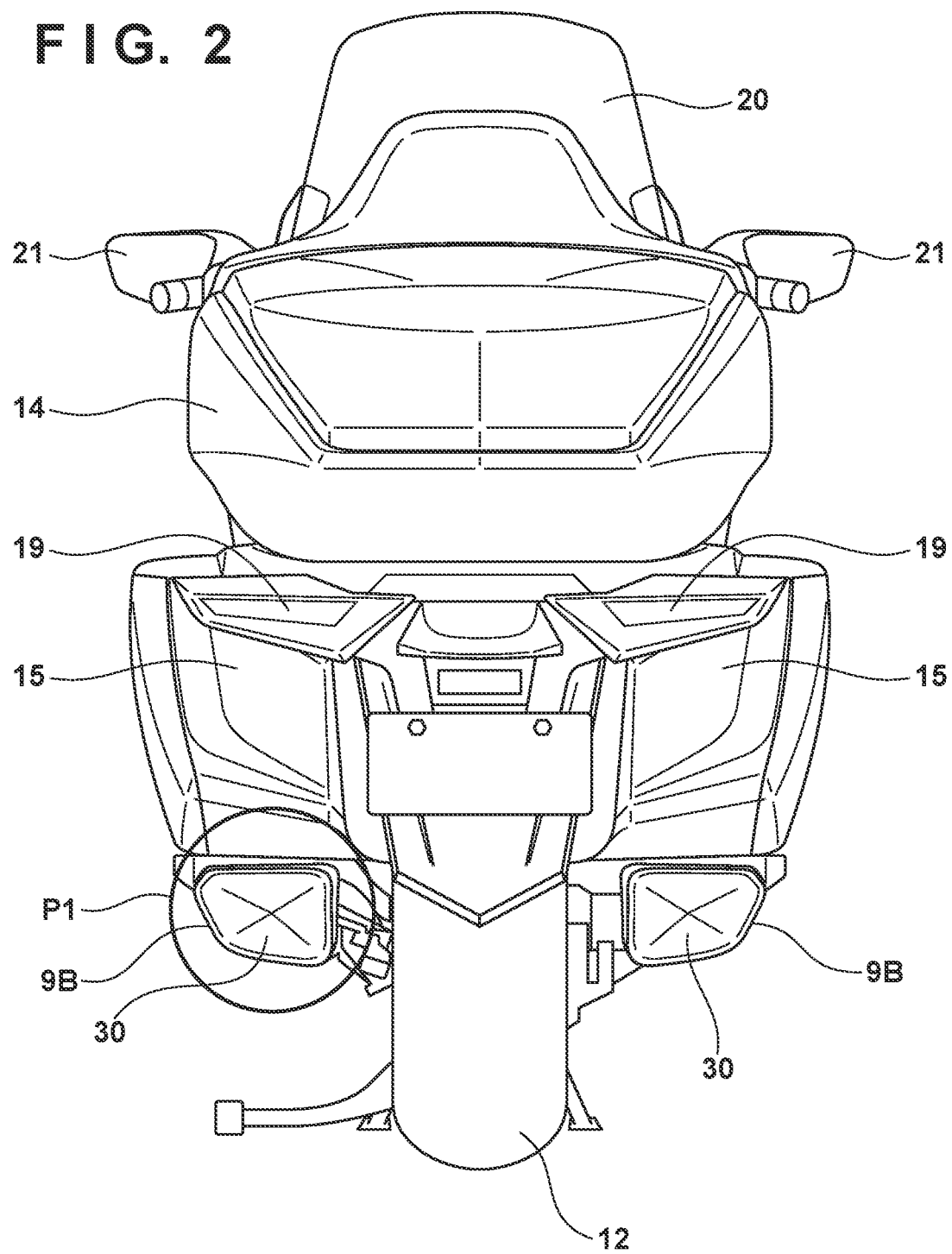
FIG. 2 is a rear view showing the external appearance of the straddle type vehicle of the present embodiment.
Figure 3:
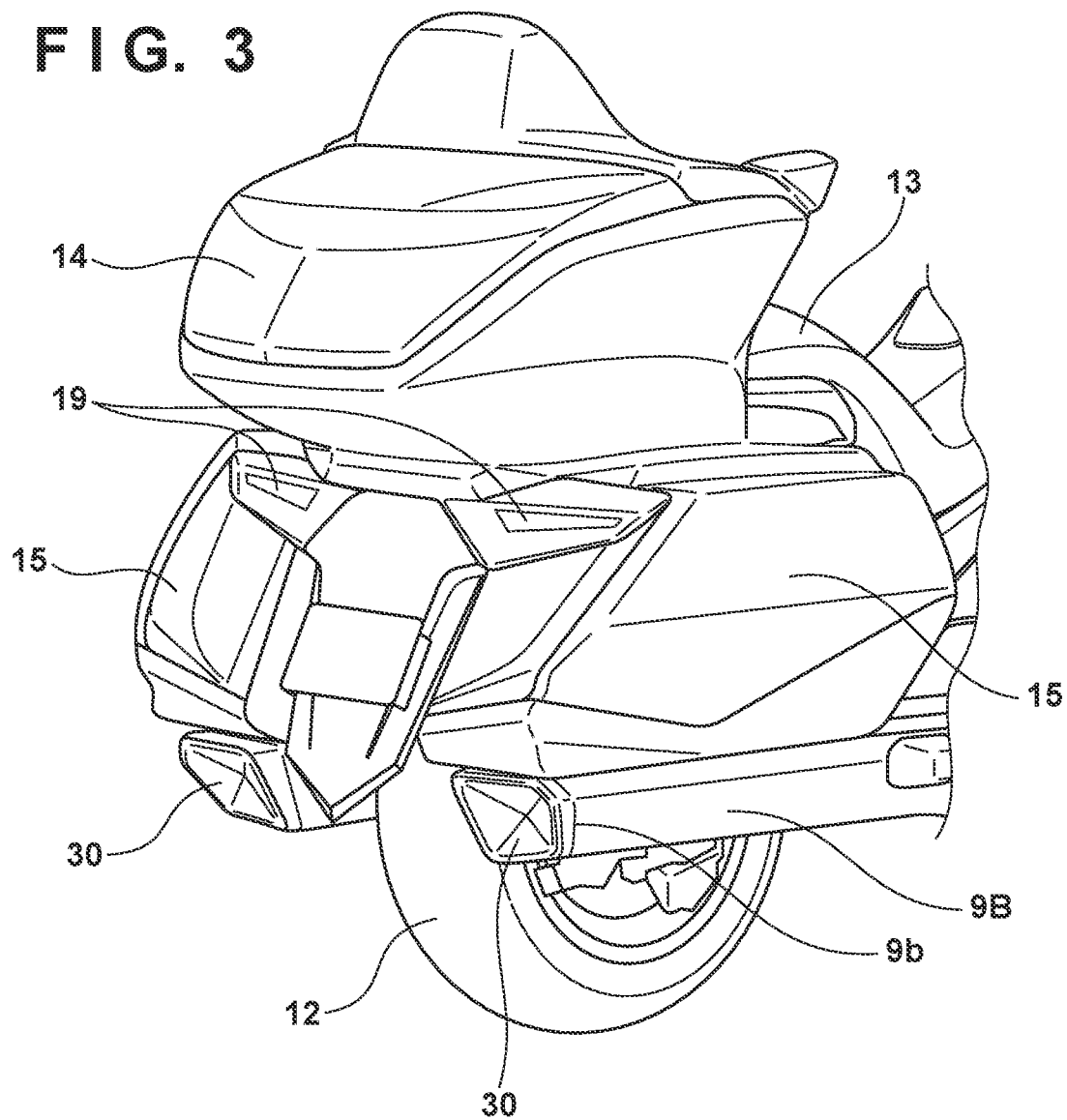
FIG. 3 is a perspective view of a rear structure of the straddle type vehicle of the present embodiment as viewed from a right rear portion.
Figure 4A:
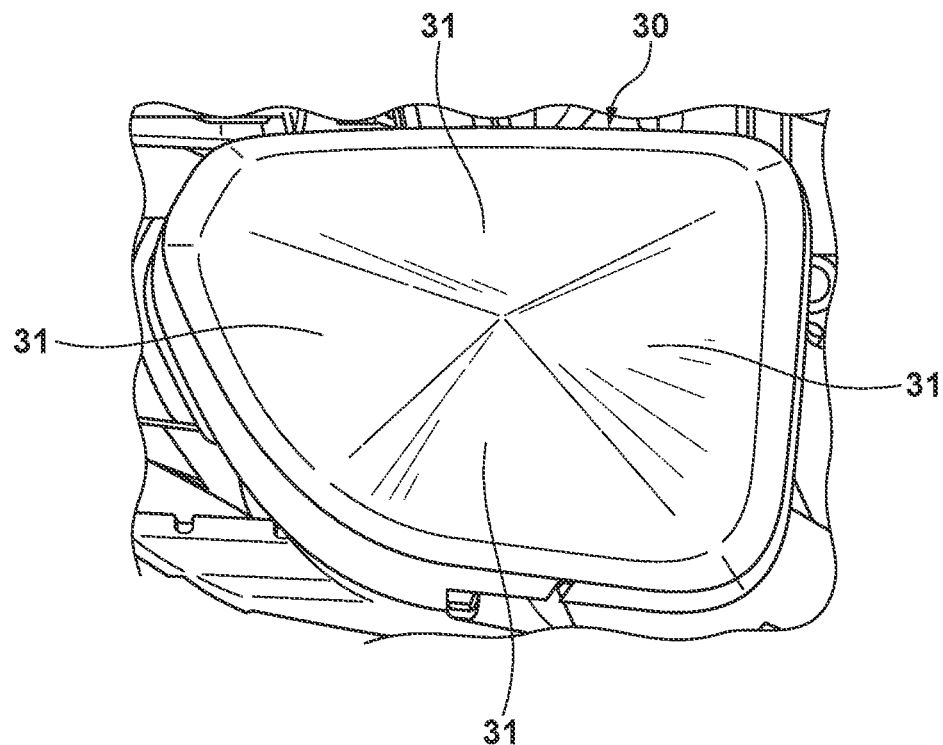
FIG. 4A is an enlarged view of a portion P1 in FIG. 2.
Figure 4B:
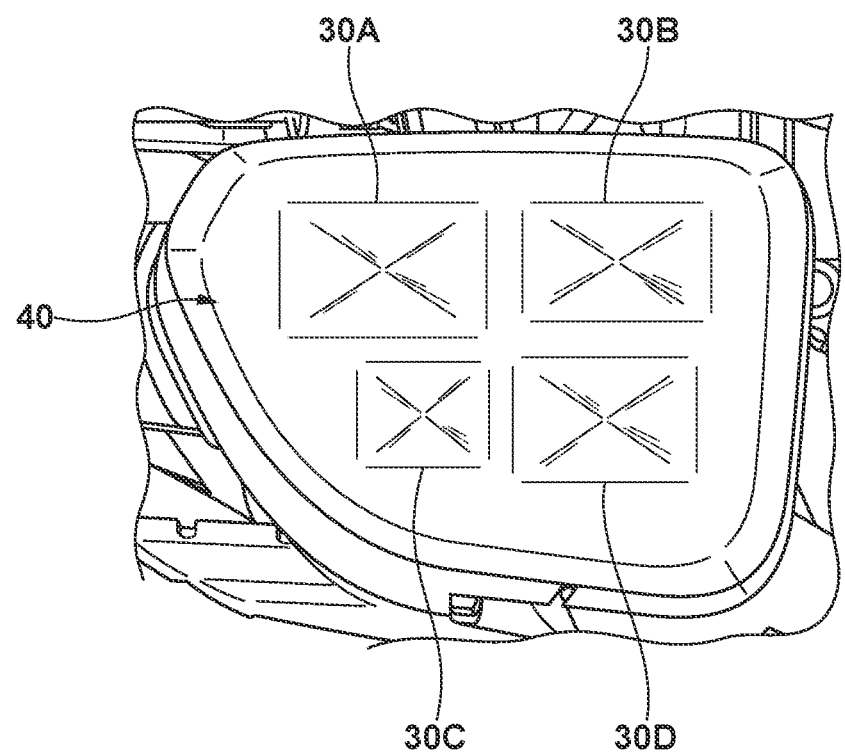
FIG. 4B is a diagram showing a layout of reflecting portions different from that of FIG. 4A.
Figure 5A:
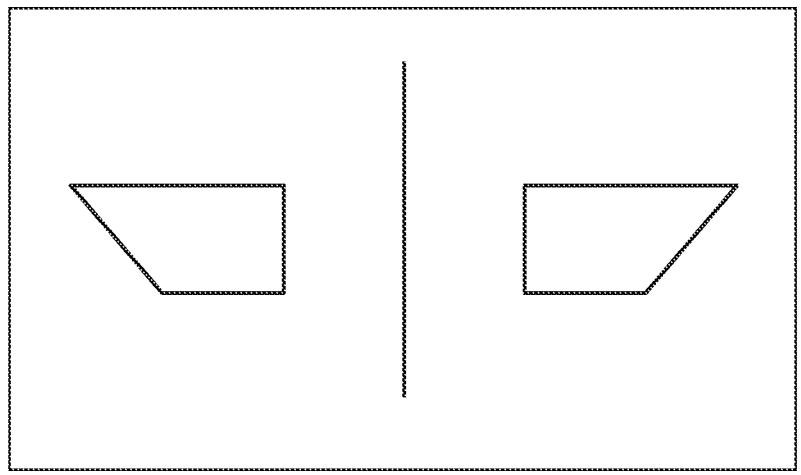
FIG. 5A is a diagram for illustrating the identifiability of the reflecting portion when the straddle type vehicle of the present embodiment travels straight.
Figure 5B:
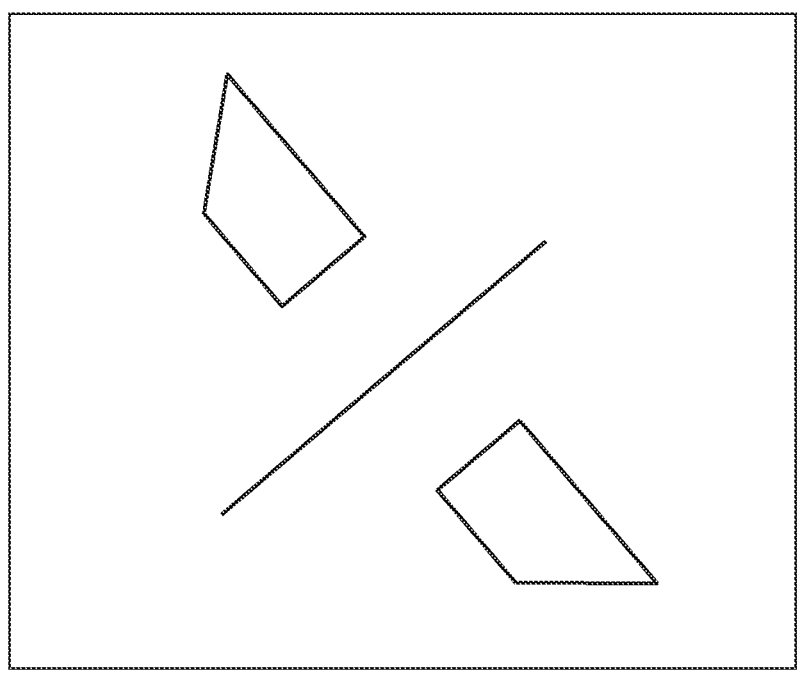
FIG. 5B is a diagram illustrating the identifiability of the reflecting portion when the straddle type vehicle of the present embodiment is inclined.

FIG. 1 is the left side view showing the external appearance of the straddle type vehicle according to the present embodiment. FIG. 2 is the rear view showing the external appearance of the straddle type vehicle of the present embodiment. FIG. 3 is the perspective view of the rear structure of the straddle type vehicle of the present embodiment as viewed from the right rear portion. FIG. 4A is the enlarged view of the portion P1 in FIG. 2. FIG. 4B is the diagram showing the layout of the reflecting portions different from that of FIG. 4A. FIG. 5A is the diagram for illustrating the identifiability of the reflecting portion when the straddle type vehicle of the present embodiment travels straight. FIG. 5B is the diagram illustrating the identifiability of the reflecting portion when the straddle type vehicle of the present embodiment is inclined.

First, an external configuration of the straddle type vehicle of the present embodiment will be described.

As shown in FIGS. 1 to 3, the straddle type vehicle of the present embodiment is, for example, a motorcycle using an internal combustion engine or an electric motor as a power source, or a hybrid motorcycle in which an internal combustion engine and an electric motor are combined.

In the straddle type vehicle 1 of the present embodiment, a front wheel 2 is rotatably supported in a lower end portion of a pair of left and right front forks 3 at a front portion of a vehicle body. The pair of left and right front forks 3 are connected to a bottom bridge and a head pipe (not shown), and are rotatably supported by a front end portion of a main frame 5. The main frame 5 extends rearward of the vehicle body from the head pipe, and the handle 6 is fixed to the head pipe. According to the structures, the front wheel 2 can be steered by the steering wheel 6.

In a central portion of the vehicle body, the main frame 5 supports a power unit including the engine 7 and the transmission 8 and an exhaust pipe 9. A seat 10 is provided in the central portion of the vehicle body, and a fuel tank 11 is arranged in a front side of the seat 10. The exhaust pipe 9 includes a plurality of exhaust manifolds 9A connected to exhaust ports of the engine 7, and a pair of left and right mufflers 9B extending rearward from the exhaust manifolds 9A. The exhaust manifold 9A is a collecting pipe in which a plurality of exhaust ports of the engine 7 are collected together and led to the muffler 9B. The mufflers 9B are arranged on both sides in the vehicle body width direction as a pair of left and right mufflers, and function as a sound eliminating device that eliminates the exhaust sound by a silencer provided therein.

In a rear portion of the vehicle body, the rear wheel 12 is rotatably supported by a pair of left and right rear suspensions (not shown). The rear suspension is connected to the main frame 5. The main frame 5 supports the exhaust manifold 9A and the muffler 9B. A rear seat 13 is provided at the rear portion of the vehicle body, and luggage boxes 14 and 15 are provided at left and right sides and a rear side of the rear seat 13 in the vehicle width direction. The luggage box 14 is provided at a rear side of the rear seat 13. The luggage boxes 15 are provided at left and right sides of the rear seat 13 in the vehicle width direction.

The front portion of the vehicle body is covered with a front cover 16 so that the vehicle body components described above are not visible from the outside. Similarly, the rear portion of the vehicle body is covered with a rear cover 18 integrated with the luggage box 15 so that the vehicle body components described above are not visible from the outside. The front cover 16 is provided with a headlight unit 17, and the rear cover 18 is provided with a taillight unit 19. A windshield 20 and a pair of left and right rearview mirrors 21 are provided above the front cover 16.

Next, referring to FIGS. 4A, 4B, 5A, and 5B in addition to FIGS. 1 to 3, a rear structure of the straddle type vehicle of the present embodiment will be described.

The straddle type vehicle 1 of the present embodiment includes at least one reflecting portion 30 that reflects a radar wave on the rear portion of the vehicle body. The reflecting portion 30 functions as a reflector that reflects a radar wave transmitted from a radar equipment (Radar) existing around the vehicle. The reflecting portion 30 is arranged at a rear portion (preferably, a rear end portion) 9b of the pair of left and right mufflers 9B, and reflects a radar wave toward the rear side of the vehicle. The radar equipment is a device that measures a distance to an object and a direction thereof by emitting a radio wave toward the object and measuring the reflected wave, and is mounted on a moving object or the like existing around the vehicle. For example, the reflecting portion 30 is attached to the rear portion 9b of the muffler 9B as a cap member.

In the present embodiment, by arranging the reflecting portion 30 on the rear portion 9b of the muffler 9B disposed below the vehicle body, it is possible to suppress the reflection wave reflected by the reflecting portion 30 from diffusing upward and to ensure the detection accuracy of the vehicle at a distance. Further, the radar wave is reflected on the lower side of the vehicle body with respect to the four-wheeled vehicle, such as the roof, which is a target of reflection up to the upper side of the vehicle body, thereby the identifiability (ease of identification) between the four-wheeled vehicle and the two-wheeled vehicle is improved.

The reflecting portion 30 is made of metal having a trapezoidal outer shape when viewed from the rear side of the vehicle body, and is provided at each of the rear portions 9b of the pair of left and right mufflers 9B. The pair of left and right reflecting portions 30 are arranged symmetrically in the vehicle width direction when viewed from the rear side of the vehicle body. In the present embodiment, one reflecting portion 30 is arranged on each of the rear portions 9b of the pair of left and right mufflers 9B, but a cap member 40 including a plurality of reflecting portions 30A to 30D (for example, four reflecting portions) may be arranged as shown in FIG. 4B. In this case, it is preferable that the plurality of reflecting portions 30A to 30D are arranged such that the reflecting directions thereof are different from each other, and for example, it is conceivable that the attaching angles are different from each other for each of the reflecting portions 30A to 30D, or the inclinations of the reflecting surfaces are different from each other for each of the reflecting portions 30A to 30D. According to the structure, even when the vehicle itself travels at a deviated lane position as shown in FIG. 5A or when the vehicle itself is inclined as shown in FIG. 5B, it is possible to ensure the identifiability for the vehicle in the vehicle width direction. Further, since the reflecting portion 30 has a decorativeness as a cap member, the external appearance when viewed from the rear side of the muffler can be improved, and the assemblability when the reflecting portion 30 is attached to the rear portion of the muffler can be improved.

The pair of left and right mufflers 9B is connected to the main frame 5 via the connecting portion 9a. The connecting portion 9a has a structure in which, for example, an attachment stay provided on the muffler 9B is fixed to the main frame 5 by fastening members such as bolts and nuts. The connecting portion 9a is arranged in a region 9c behind the central portion LO (see FIG. 1) in a longitudinal (front-and-rear) direction of the vehicle body in the muffler 9B. Accordingly, the vibration of the muffler 9B caused by the behavior of the vehicle body and the vibration of the engine can be suppressed, the angular change of the reflecting surface 31 of the reflecting portion 30 can be suppressed, and the reflection accuracy can be secured.

The reflecting portion 30 has a reflecting surface 31 arranged in a quadrangular pyramid shape when viewed from the rear side of the vehicle body. The reflecting surface 31 has a concave shape recessed toward the front side of the vehicle body in a state of being attached to the rear portion 9b of the muffler 9B. The reflecting surface 31 is not limited to a shape recessed toward the front side of the vehicle body, and may be, for example, a shape protruding toward the rear side of the vehicle body. Further, the reflecting surface 31 is not limited to the quadrangular pyramid shape, and may be a curved surface shape such as parabola. Thereby, the reflection capability of the reflecting portion 30 can be improved.

Further, although the reflecting portion 30 is arranged in the rear portion 9b of the pair of left and right mufflers 9B, the reflecting portion 30 may be additionally arranged in the rear portion of the taillight unit 19, the luggage boxes 14 and 15, or the like. As a result, it is possible to improve the external appearance when viewed from the rear side of the vehicle body while improving the reflection capability.

Since the reflecting portion 30 is arranged in the rear portion 9b of the muffler 9B of the present embodiment, an exhaust outlet 9d is directed toward the lower side of the vehicle body immediately before the rear portion 9b of the muffler 9B instead of the rear portion 9b of the vehicle body. The exhaust outlet 9d of the muffler 9B may be directed toward the side of the vehicle body or toward the upper side of the vehicle body.

As described above, according to the vehicle body rear structure of the present embodiment, not only the identifiability for the two-wheeled vehicle but also the appearance and the assemblability can be improved.

The invention is not limited to the foregoing embodiments, and various variations and/or changes are possible within the spirit of the invention.

What is claimed is:

1. A straddle type vehicle having a reflector for reflecting a radar wave transmitted from a radar equipment,
   wherein the reflector is provided on a cap mounted on a rear end portion of an exhaust pipe,
   the exhaust pipe includes an exhaust manifold connected to an engine, and a muffler extending rearward from the exhaust manifold,
   the muffler is connected to a vehicle body via a connector,
   the connector is arranged rearward of a central portion of the muffler in a longitudinal direction of the vehicle body,
   a pair of left and right mufflers are arranged on both sides of the vehicle body in a vehicle width direction and extend horizontally rearward the vehicle body,
   luggage boxes are provided at both sides of a rear seat in the vehicle width direction, the mufflers are arranged below the luggage boxes,
   the reflector is provided at the rear end of the muffler and provided in the rear portion of the luggage boxes,
   the cap is provided with a plurality of reflectors, and
   the plurality of reflectors have different reflecting directions and outer shapes when viewed from a rear side of the vehicle body.

2. The straddle type vehicle according to claim 1, wherein the reflector has a quadrangular pyramid shape in which a plurality of reflecting surfaces are recessed toward a front side of the vehicle body.

3. The straddle type vehicle according to claim 1, wherein the exhaust pipe has an exhaust outlet for exhausting downward immediately before the rear portion of the exhaust pipe.

* * * * *